US011232065B2

(12) United States Patent
Bansod et al.

(10) Patent No.: US 11,232,065 B2
(45) Date of Patent: *Jan. 25, 2022

(54) USING A UNIX-BASED FILE SYSTEM TO MANAGE AND SERVE CLONES TO WINDOWS-BASED COMPUTING CLIENTS

(71) Applicant: Commvault Systems, Inc., Tinton Falls, NJ (US)

(72) Inventors: Ketan Bansod, South Amboy, NJ (US); Hiten Suresh Parmar, Tinton Falls, NJ (US); Bin Yao, Mississauga (CA)

(73) Assignee: Commvault Systems, Inc., Tinton Falls, NJ (US)

( * ) Notice: Subject to any disclaimer, the term of this patent is extended or adjusted under 35 U.S.C. 154(b) by 206 days.

This patent is subject to a terminal disclaimer.

(21) Appl. No.: 16/371,807

(22) Filed: Apr. 1, 2019

(65) Prior Publication Data

US 2019/0227984 A1 Jul. 25, 2019

Related U.S. Application Data

(63) Continuation of application No. 14/684,188, filed on Apr. 10, 2015, now Pat. No. 10,311,150.

(51) Int. Cl.
*G06F 16/11* (2019.01)

(52) U.S. Cl.
CPC ................... *G06F 16/116* (2019.01)

(58) Field of Classification Search
CPC .. G06F 16/116; G06F 17/30067; G06F 3/067; G06F 3/0643; G06F 17/30091; G06F 3/0644

(Continued)

(56) References Cited

U.S. PATENT DOCUMENTS

| 4,685,620 A | 8/1987 | Ng |
| 4,995,035 A | 2/1991 | Cole et al. |

(Continued)

FOREIGN PATENT DOCUMENTS

| EP | 0259912 A1 | 3/1988 |
| EP | 0405926 A2 | 1/1991 |

(Continued)

OTHER PUBLICATIONS

U.S. Appl. No. 14/148,016, filed Jan. 6, 2014, Bansod et al.

(Continued)

*Primary Examiner* — Hosain T Alam
*Assistant Examiner* — Nicholas E Allen
(74) *Attorney, Agent, or Firm* — Commvault Systems, Inc.

(57) ABSTRACT

Systems and methods use a ZFS file system in a Windows-based computing environment without protocol conversion or native ZFS support on Windows-based computing devices. Windows-based computing devices may obtain native Windows-based access to data in a storage volume that is managed by a Unix-based storage management server executing a ZFS volume manager and file system. ZFS clones may be served as logical unit numbers to Windows-based computing devices. The ZFS nature of the accessed storage volume is unbeknownst to the Windows-based machines. This enables Windows-based utilities, applications, and tools executing on a Windows-based computing device to operate upon the data in ZFS-managed space the same as they might have operated on a workspace in an array-created hardware snapshot in the prior art. Users may use storage space from their Windows-based computing devices according to a Windows-based file system such as NTFS. The Windows-based formatting of the contents in the ZFS-managed volumes are unbeknownst to the Unix-based (Continued)

storage management server and to the ZFS volume manager and file system.

20 Claims, 8 Drawing Sheets

(58) Field of Classification Search
USPC .......................................................... 707/823
See application file for complete search history.

(56) References Cited

U.S. PATENT DOCUMENTS

| | | | |
|---|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,604,862 A | 2/1997 | Midgely et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,812,398 A | 9/1998 | Nielsen |
| 5,813,009 A | 9/1998 | Johnsen et al. |
| 5,813,017 A | 9/1998 | Morris |
| 5,819,292 A | 10/1998 | Hitz et al. |
| 5,875,478 A | 2/1999 | Blumenau |
| 5,878,408 A | 3/1999 | Van Huben et al. |
| 5,887,134 A | 3/1999 | Ebrahim |
| 5,901,327 A | 5/1999 | Ofek |
| 5,907,672 A | 5/1999 | Matze et al. |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,021,475 A | 2/2000 | Nguyen et al. |
| 6,026,414 A | 2/2000 | Anglin |
| 6,052,735 A | 4/2000 | Ulrich et al. |
| 6,072,490 A | 6/2000 | Bates et al. |
| 6,076,148 A | 6/2000 | Kedem |
| 6,094,416 A | 7/2000 | Ying |
| 6,101,585 A | 8/2000 | Brown et al. |
| 6,131,095 A | 10/2000 | Low et al. |
| 6,131,148 A | 10/2000 | West et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,195,695 B1 | 2/2001 | Cheston et al. |
| 6,205,450 B1 | 3/2001 | Kanome |
| 6,212,512 B1 | 4/2001 | Barney et al. |
| 6,260,069 B1 | 7/2001 | Anglin |
| 6,269,431 B1 | 7/2001 | Dunham |
| 6,275,963 B1 | 8/2001 | Vahalia et al. |
| 6,301,592 B1 | 10/2001 | Aoyama et al. |
| 6,311,193 B1 | 10/2001 | Sekido |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,366,986 B1 | 4/2002 | St. Pierre et al. |
| 6,366,988 B1 | 4/2002 | Skiba et al. |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,434,681 B1 | 8/2002 | Armangau |
| 6,473,775 B1 | 10/2002 | Kusters et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,604,118 B2 | 8/2003 | Kleiman et al. |
| 6,631,477 B1 | 10/2003 | LeCrone et al. |
| 6,643,671 B2 | 11/2003 | Milillo et al. |
| 6,647,473 B1 | 11/2003 | Golds et al. |
| 6,651,075 B1 | 11/2003 | Kusters et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,721,767 B2 | 4/2004 | De Meno et al. |
| 6,728,736 B2 | 4/2004 | Hostetter et al. |
| 6,732,125 B1 | 5/2004 | Autrey et al. |
| 6,760,723 B2 | 7/2004 | Oshinsky et al. |
| 6,792,518 B2 | 9/2004 | Armangau et al. |
| 6,799,258 B1 | 9/2004 | Linde |
| 6,826,661 B2 | 11/2004 | Umbehocker et al. |
| 6,832,299 B2 | 12/2004 | Shimada et al. |
| 6,871,271 B2 | 3/2005 | Ohran et al. |
| 6,880,051 B2 | 4/2005 | Timpanaro-Perrotta |
| 6,898,688 B2 | 5/2005 | Martin et al. |
| 6,912,627 B2 | 6/2005 | Matsunami et al. |
| 6,915,313 B2 | 7/2005 | Yao |
| 6,938,135 B1 | 8/2005 | Kekre et al. |
| 6,948,038 B2 | 9/2005 | Berkowitz et al. |
| 6,948,089 B2 | 9/2005 | Fujibayashi |
| 6,954,834 B2 | 10/2005 | Slater et al. |
| 6,959,310 B2 | 10/2005 | Eshel et al. |
| 6,981,114 B1 | 12/2005 | Wu et al. |
| 6,981,177 B2 | 12/2005 | Beattie |
| 6,993,539 B2 | 1/2006 | Federwisch et al. |
| 7,003,641 B2 | 2/2006 | Prahlad et al. |
| 7,035,880 B1 | 4/2006 | Crescenti et al. |
| 7,080,088 B1 | 7/2006 | Lau |
| 7,165,079 B1 | 1/2007 | Chen et al. |
| 7,174,352 B2 | 2/2007 | Kleiman et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,231,544 B2 | 6/2007 | Tan et al. |
| 7,234,115 B1 | 6/2007 | Sprauve et al. |
| 7,237,075 B2 | 6/2007 | Welsh et al. |
| 7,240,219 B2 | 7/2007 | Teicher et al. |
| 7,275,177 B2 | 9/2007 | Armangau et al. |
| 7,296,125 B2 | 11/2007 | Ohran |

(56) References Cited

U.S. PATENT DOCUMENTS

| | | |
|---|---|---|
| 7,346,623 B2 | 3/2008 | Prahlad et al. |
| 7,383,538 B2 | 6/2008 | Bates et al. |
| 7,386,532 B2 | 6/2008 | Kiessig et al. |
| 7,395,282 B1 | 7/2008 | Crescenti et al. |
| 7,406,048 B2 | 7/2008 | Datta et al. |
| 7,412,583 B2 | 8/2008 | Burton et al. |
| 7,426,052 B2 | 9/2008 | Cox et al. |
| 7,454,443 B2 | 11/2008 | Ram et al. |
| 7,480,779 B2 | 1/2009 | Tsuji |
| 7,509,316 B2 | 3/2009 | Greenblatt et al. |
| 7,523,278 B2 | 4/2009 | Thompson et al. |
| 7,529,782 B2 | 5/2009 | Prahlad et al. |
| 7,539,707 B2 | 5/2009 | Prahlad et al. |
| 7,539,735 B2 | 5/2009 | Fruchtman et al. |
| 7,549,028 B2 | 6/2009 | Thompson et al. |
| 7,565,572 B2 | 7/2009 | Yamasaki |
| 7,567,991 B2 | 7/2009 | Armangau et al. |
| 7,568,080 B2 | 7/2009 | Prahlad et al. |
| 7,580,950 B2 | 8/2009 | Kavuri et al. |
| 7,587,563 B1 | 9/2009 | Teterin et al. |
| 7,596,611 B1 | 9/2009 | Satish et al. |
| 7,600,219 B2 | 10/2009 | Tsantilis |
| 7,620,666 B1 | 11/2009 | Root et al. |
| 7,651,593 B2 | 1/2010 | Prahlad et al. |
| 7,668,884 B2 | 2/2010 | Prahlad et al. |
| 7,707,184 B1 | 4/2010 | Zhang et al. |
| 7,716,171 B2 | 5/2010 | Kryger |
| 7,716,183 B2 | 5/2010 | Lee |
| 7,725,440 B2 | 5/2010 | Reed et al. |
| 7,734,578 B2 | 6/2010 | Prahlad et al. |
| 7,761,456 B1 | 7/2010 | Cram et al. |
| 7,840,533 B2 | 11/2010 | Prahlad et al. |
| 7,840,537 B2 | 11/2010 | Gokhale et al. |
| 7,844,577 B2 | 11/2010 | Becker et al. |
| 7,873,806 B2 | 1/2011 | Prahlad et al. |
| 7,882,077 B2 | 2/2011 | Gokhale et al. |
| 7,933,927 B2 | 4/2011 | Dee et al. |
| 7,979,389 B2 | 7/2011 | Prahlad et al. |
| 8,055,625 B2 | 11/2011 | Prahlad et al. |
| 8,117,410 B2 | 2/2012 | Lu et al. |
| 8,140,786 B2 | 3/2012 | Bunte et al. |
| 8,140,794 B2 | 3/2012 | Prahlad et al. |
| 8,161,077 B2 | 4/2012 | Zha et al. |
| 8,170,995 B2 | 5/2012 | Prahlad et al. |
| 8,195,623 B2 | 6/2012 | Prahlad et al. |
| 8,219,524 B2 | 7/2012 | Gokhale |
| 8,245,192 B1 * | 8/2012 | Chen .................. G06F 8/71 717/122 |
| 8,285,671 B2 | 10/2012 | Prahlad et al. |
| 8,307,177 B2 | 11/2012 | Prahlad et al. |
| 8,401,996 B2 | 3/2013 | Muller et al. |
| 8,433,682 B2 | 4/2013 | Ngo |
| 8,433,872 B2 | 4/2013 | Prahlad et al. |
| 8,442,944 B2 | 5/2013 | Prahlad et al. |
| 8,453,145 B1 * | 5/2013 | Naik ................ G06F 9/45537 718/1 |
| 8,468,518 B2 | 6/2013 | Wipfel |
| 8,489,830 B2 | 7/2013 | Wu et al. |
| 8,543,998 B2 | 9/2013 | Barringer |
| 8,544,016 B2 | 9/2013 | Friedman et al. |
| 8,578,120 B2 | 11/2013 | Attarde et al. |
| 8,583,594 B2 | 11/2013 | Prahlad et al. |
| 8,595,191 B2 | 11/2013 | Prahlad et al. |
| 8,655,846 B2 | 2/2014 | Prahlad et al. |
| 8,719,767 B2 | 5/2014 | Bansod |
| 8,726,242 B2 | 5/2014 | Ngo |
| 8,805,953 B2 | 8/2014 | Murphy et al. |
| 8,898,411 B2 | 11/2014 | Prahlad et al. |
| 8,959,299 B2 | 2/2015 | Ngo et al. |
| 10,311,150 B2 | 6/2019 | Bansod et al. |
| 2002/0107877 A1 | 8/2002 | Whiting et al. |
| 2003/0028514 A1 | 2/2003 | Lord et al. |
| 2003/0033346 A1 | 2/2003 | Carlson et al. |
| 2003/0167380 A1 | 9/2003 | Green et al. |
| 2003/0177149 A1 | 9/2003 | Coombs |
| 2004/0139125 A1 | 7/2004 | Strassburg et al. |
| 2004/0170374 A1 | 9/2004 | Bender et al. |
| 2004/0230566 A1 | 11/2004 | Balijepalli et al. |
| 2004/0260678 A1 | 12/2004 | Verbowski et al. |
| 2005/0203864 A1 | 9/2005 | Schmidt et al. |
| 2006/0224846 A1 | 10/2006 | Amarendran et al. |
| 2008/0228771 A1 | 9/2008 | Prahlad et al. |
| 2009/0276771 A1 | 11/2009 | Nickolov et al. |
| 2009/0319534 A1 | 12/2009 | Gokhale |
| 2010/0070474 A1 | 3/2010 | Lad |
| 2010/0077165 A1 | 3/2010 | Lu et al. |
| 2010/0082672 A1 | 4/2010 | Kottomtharayil et al. |
| 2010/0257218 A1 * | 10/2010 | Vassilev ................ G06F 16/188 707/823 |
| 2010/0293144 A1 | 11/2010 | Bonnet |
| 2010/0312754 A1 | 12/2010 | Bear et al. |
| 2010/0313185 A1 | 12/2010 | Gupta et al. |
| 2011/0153697 A1 * | 6/2011 | Nickolov ................ H04L 67/10 707/827 |
| 2011/0264635 A1 * | 10/2011 | Yang .................. G06F 11/1402 707/695 |
| 2011/0283113 A1 * | 11/2011 | Moffat .................. G06F 21/602 713/189 |
| 2012/0137303 A1 * | 5/2012 | Okada .................... G06F 3/0608 718/104 |
| 2013/0185258 A1 * | 7/2013 | Bestler ................ G06F 16/1844 707/638 |
| 2013/0246360 A1 | 9/2013 | Ngo |
| 2013/0254383 A1 * | 9/2013 | Wray ...................... H04L 47/70 709/224 |
| 2013/0262387 A1 | 10/2013 | Varadharajan et al. |
| 2013/0332610 A1 * | 12/2013 | Beveridge ........... G06F 9/45558 709/226 |
| 2014/0046900 A1 * | 2/2014 | Kumarasamy ...... G06F 11/1489 707/620 |
| 2014/0075031 A1 * | 3/2014 | Doering .................. H04L 47/70 709/226 |
| 2014/0075440 A1 | 3/2014 | Prahlad et al. |
| 2014/0108339 A1 * | 4/2014 | Marsden ............... G06F 16/273 707/611 |
| 2014/0114922 A1 | 4/2014 | Prahlad et al. |
| 2014/0201154 A1 * | 7/2014 | Varadharajan ...... G06F 11/1456 707/647 |
| 2014/0229566 A1 * | 8/2014 | Ustalov ............... G06F 11/3485 709/216 |
| 2014/0279950 A1 * | 9/2014 | Shapiro ................. G06F 16/164 707/692 |
| 2014/0282472 A1 * | 9/2014 | Vinograd .................. G06F 8/65 717/170 |
| 2014/0310247 A1 * | 10/2014 | Vijayan ............... G06F 11/1456 707/679 |
| 2015/0020059 A1 * | 1/2015 | Davis ........................ G06F 8/60 717/171 |
| 2015/0066858 A1 * | 3/2015 | Sabdar .................. G06F 16/128 707/639 |
| 2015/0169413 A1 | 6/2015 | Ngo et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0838758 A2 | 4/1998 |
| EP | 0899662 A1 | 3/1999 |
| EP | 0981690 A1 | 2/2000 |
| EP | 1349088 A2 | 10/2003 |
| EP | 1579331 A2 | 9/2005 |
| GB | 2256952 A | 12/1992 |
| GB | 2411030 A | 8/2005 |
| JP | H05-189281 A | 7/1993 |
| JP | H06-274605 A | 9/1994 |
| JP | H09-016463 A | 1/1997 |
| JP | H11-259348 A | 9/1999 |
| JP | 2000-347811 A | 12/2000 |
| WO | WO 1993/003549 A1 | 2/1993 |
| WO | WO 1995/013580 A1 | 5/1995 |
| WO | WO 1999/012098 A1 | 3/1999 |

(56) References Cited

FOREIGN PATENT DOCUMENTS

| WO | WO 2001/004755 A1 | 1/2001 |
|---|---|---|
| WO | WO 2002/088943 A1 | 11/2002 |
| WO | WO 2003/028183 A1 | 4/2003 |
| WO | WO 2003/046768 A1 | 6/2003 |
| WO | WO 2004/034197 A2 | 4/2004 |
| WO | WO 2007/021997 A2 | 2/2007 |
| WO | WO 2008/080143 A2 | 7/2008 |

OTHER PUBLICATIONS

Armstead et al., "Implementation of a Campwide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5-9, 1995, pp. 420-427, San Francisco, CA.
CNET Reviews, "IPStor Enterprise Edition Zeroimpact Backup Enabler Option—(V.4.0) Manufacturer Description", May 8, 2004, 1 page.
CommVault Partner Advantage, "CommVault First to Market with Complete 'Zero Impact' Backup Solutions for Mixed Windows and UNIX Environments", , Sep. 25, 2002, 2 pages.
CommVault Systems, Inc., "CommVault Galaxy Express 7.0 Backup & Recovery," copyright date 1999-2007, 4 pages.
CommVault Systems, Inc., "CommVault QiNetix: Architecture Overview," CommVault Systems White Paper, 2005, 35 pages.
CommVault Systems, Inc., "CommVault Simpana Software with SnapBackup," copyright date 1999-2009, 6 pages.
CommVault, "Remote Backup,", Internet accessed on Dec. 17, 2009, 8 pages.
CommVault, "Snap Backup,", Internet accessed on Dec. 17, 2009, 7 pages.
CommVault, "Snapshots,", Internet accessed on Dec. 15, 2009, 2 pages.
CommVault, "vol. Shadow Services (VSS),", Internet accessed on Dec. 23, 2009, 1 page.
Dell Storage Engineering, Deploying Solaris 11 with EqualLogic Arrays, Dell Inc., Feb. 2014 (17 pgs.).
Eitel, "Backup and Storage Management in Distributed Heterogeneous Environments," IEEE, Jun. 12-16, 1994, pp. 124-126.
EMC Corporation, "EMC CLARiiON CX Series,"May 2006, 7 pages.
EMC Corporation, "EMC CLARiiON CX3 UltraScale Series," Feb. 2008, 6 pages.
EMC Corporation, "EMC Symmetrix DMX Series," Jan. 2008, 8 pages.
Extended European Search Report in Application No. 09815090.7, dated Oct. 25, 2012, 8 pages.
FalconStor Software, "Impact-free Backup of Vmware Environments", http://www.falconstor.com/dmdocuments/HyperTrac_for_VMware_SB_HR.pdf>, 2011, 2 pages.
FalconStor Software, "Unified Backup & DR for Vmware Environments", http://www.falconstor.com/dmdocuments/UniBU-DR_CDP_SB_100520.pdf>, 2001, 2 pages.
FalconStor Software, "Zero-impact Unified Backup & DR", , undated, Internet accessed May 2, 2012, 1 page.
Fegreus, CommVault Simpana 8.0, Mar. 3, 2010, http://www.virtual-strategy.com/2010/03/03/commvault-simpana.
Gait, J., "The Optical File Cabinet: A Random-Access File System for Write-Once Optical Disks," IEEE Computer, vol. 21, No. 6, pp. 11-22 (Jun. 1988).
Garimella, N., "Understanding and Exploiting Snapshot Technology for Data Protection, Part 1: Snapshot Technology Overview," Internet accessed on Dec. 22, 2009, 8 pages.

Harriman-Polanski, CommVault Galaxy Enhances Data Protection, Reprinted from Dell Power Solutions, May 2006.
Hitachi Data Systems, "Hitachi HiCommand Protection Manager Software," Feb. 2007, 2 pages.
Jander, M., "Launching Storage-Area Net," Data Communications, US, McGraw Hill, NY, vol. 27, No. 4 (Mar. 21, 1998), pp. 64-72.
Managing Data More Effectively in Virtualized Environments with CommVault® Simpana® Universal Virtual Software Agent, © 1999-2009.
Marshall, David, "Veeam's SureBackup transforms VMware image backups,", Internet accessed on Mar. 23, 2010, 4 pages.
Microsoft TechNet, "How Volume Shadow Copy Service Works,", Internet accessed on Dec. 17, 2009, 4 pages.
Microsoft TechNet, "Overview of Exchange Server Backup Methods,", Internet accessed on Dec. 29, 2009, 3 pages.
Microsoft TechNet, "What is Volume Shadow Copy Service?" Mar. 28, 2003, 5 pages.
Microsoft, "Microsoft System Center Data Protection Manager 2007: Microsoft Exchange Server," undated, 4 pages.
Microsoft, "Microsoft System Center Data Protection Manager 2007: Microsoft SharePoint Products and Technologies," undated, 4 pages.
Microsoft, "Microsoft System Center Data Protection Manager 2007: Product Overview," undated, page.
Microsoft.com, "XADM: Hot Split Snapshot Backups of Exchange,", Internet accessed on Dec. 29, 2009, 5 pages.
MSDN, "Backup Sequence Diagram,", Internet accessed on Dec. 30, 2009, 1 page.
MSDN, "Exchange Transaction Logs and Checkpoint Files,", Internet accessed on Dec. 30, 2009, 1 page.
MSDN, "Identifying Required Transaction Logs,", Internet accessed on Dec. 30, 2009, 1 page.
MSDN, "Overview of Processing a Backup Under VSS,", Internet accessed on Dec. 18, 2009, 3 pages.
MSExchange.org, "Exchange log disk is full, Prevention and Remedies,", Internet accessed on Dec. 30, 2009, 7 pages.
Netapp, "NetApp SnapManager for Microsoft Exchange," 2009, 2 pages.
Network Appliance, Inc., "Network Appliance Snapshot Technology," copyright 2004, 1 page.
OpenAir.com, Product Update—Jun. 21, 2001, http://web.archive.org/web/20011007153900lhttp:llwww.openair.comlhomeln.s-ub.--p. sub.-update062101 .html, Oct. 2001, 3 pages.
Oracle Corporation, "Realizing the Superior Value of Oracle ZFS Storage Appliance," Oracle White Paper, Redwood Shores, California, Mar. 2015 (12 pgs.).
Robinson, Simon, "CommVault Unveils QiNetix to Unite Data Movement with Storage Management", 451 Research, Oct. 11, 2002, 3 pages.
Rosenblum et al., "The Design and Implementation of a Log-Structured File System," Operating Systems Review SIGOPS, vol. 25, No. 5, New York, US, pp. 1-15 (May 1991).
"Software Builds and the Virtual Machine," Dr. Dobb's, Jan. 23, 2008, 2 pages.
Tanenbaum, Andrew S. Structured Computer Organization, 1984, Prentice-Hall, Inc. second edition, pp. 10-12.
Veeam Software, "The New Standard for Data Protection," Internet accessed on Mar. 23, 2010, 2 pages.
Veritas Software Corporation, "Veritas Volume Manager 3.2, Administrator's Guide," Aug. 2001, 360 pages.
Wikipedia.org, "Snapshot (computer storage),", Internet accessed on Dec. 15, 2009, 3 pages.
Partial Supplementary European Search Report in Application No. 10841622.3, dated Feb. 11, 2015, 5 pages.
International Search Report and Written Opinion for International Application No. PCT/US10/62146, dated Feb. 18, 2011, 9 pages.
International Search Report and Written Opinion for International Application No. PCT/US10/62158; dated Feb. 23, 2011, 8 pages.
International Search Report and Written Opinion for International Application No. PCT/US09/57102, dated Nov. 6, 2009, 14 pages.

(56) References Cited

OTHER PUBLICATIONS

International Search Report and Written Opinion for International Application No. PCT/US2004/038323, dated Feb. 19, 2008, 10 pages.

* cited by examiner

FIG. 2  System 200 For Using A Unix-Based Filesystem In A Windows-Based Development Environment To Manage & Serve ZFS Clones To Windows-Based Computing Clients

USING A UNIX-BASED FILE SYSTEM TO MANAGE AND SERVE CLONES TO WINDOWS-BASED COMPUTING CLIENTS

INCORPORATION BY REFERENCE TO ANY PRIORITY APPLICATIONS

This application is a Continuation of U.S. patent application Ser. No. 14/684,188 filed on Apr. 10, 2015, which is incorporated by reference herein. Any and all applications for which a foreign or domestic priority claim is identified in the Application Data Sheet of the present application are hereby incorporated by reference under 37 CFR 1.57.

BACKGROUND

Software development environments are computing environments that support both (i) a production (or "official") platform, and also (ii) informal workspaces that are derived from the official and which developers use on their own private computing devices to develop new source code and/or diagnostics and/or bugfixes. Typically, the production platform comprises an official software base (including, e.g., source code, files, configuration parameters, etc.) for building executable code and/or associated binary files (the "executable"). The executable(s) may be provided to customers as an "official release." The official software base (or "build") may be stored in a build-volume on a storage device such as a storage array. A so-called build server may manage the source code in the software base and may also generate the official release from an official software base.

Workspaces are private developer copies that may be derived from an official software base. Typically, a developer obtains a copy of the official software base to use as a workspace on her/his own computing device. The workspace may be tested and if the changes are deemed of appropriate quality, the workspace may be submitted for integration, so that the changes developed by the developer may be incorporated into the official base.

The process for obtaining copies of the official software base and generating workspaces for a large number of developers may consume huge amounts of storage. Because each developer may be working with one or more workspaces at any given time (e.g., on several different releases and/or features) and each workspace may comprise a copy of an official software base, which may be very large to begin with, the storage consumed by so many copies could rapidly exceed the storage capacity available in the development environment. An exemplary prior-art approach to providing workspaces and the necessary storage therefor is presented in FIG. 1. This approach and others like it have disadvantages that make them unsuitable for certain large software development environments that operate with a large software base and have many developers vying for workspaces.

FIG. 1 depicts a typical prior-art approach to providing connectivity and storage for workspaces in a software development environment 100. FIG. 1 depicts storage array 104, comprising a build-volume BV1 and n array-created hardware snapshots S1-Sn; build server 106, and n user computing devices D1-Dn (108). Logical communication pathways between the components are depicted by the dotted bi-directional arrows labeled 150, and 151-1, . . . , 151-n.

Storage array 104 may be a high-capacity mass storage device that is well known in the art. Storage array 104 also includes array-based hardware snapshot capability, which is also well-known in the art and is discussed in more detail in regard to array-created hardware snapshots S1-Sn. Storage array 104 may comprise one or more data storage technologies, and may be any kind of block storage array, e.g., storage-area network (SAN) array technologies. An example of storage array 104 may be a Dell EqualLogic™ array from Dell, Inc. of Round Rock, Tex., USA. Storage array 104 may comprise several volumes, including build-volume BV1 (element 110) and n array-created hardware snapshots S1-Sn (elements 111-1, . . . , 111-n).

Build server 106 is a computing device, well known in the art, which is generally directed at managing source code, which may include compiling the source code in a software base and generating executables. In the present example, build server 106 executes a Microsoft Windows® operating system (e.g., from Microsoft Corp., Redmond, Wash., USA), and therefore may be referred to as a Windows-based computing device. Software development environment 100 as a whole may be referred to as a Windows-based development environment, because the build server 106 and developers' machines 108 are Windows-based computing devices. Build server 106 may perform one or more of the following functions in software development environment 100:

Establish communications with storage array 104, e.g., via logical communication path 150.
    Request storage array 104 to create build-volume BV1, e.g., sized at 200 GB to accommodate a software base.
    Map build-volume BV1 to build server 106.
    Mount build-volume BV1 to build server 106 as a logical volume number.
    Format build-volume BV1 according to a Windows-based file system, e.g., New Technology File system (NTFS) from Microsoft Corp., which executes on build server 106.
    Use build-volume BV1 as a Windows-based (e.g., NTFS) volume for storing a software base or build, e.g., build 16.
    User computer devices D1-Dn (elements 108-1, . . . , 108-n) are computing devices assigned to individual developers, and may be referred to herein as "developer machines." In the present example, each developer machine D (component 108) executes a Microsoft Windows operating system, and may be referred to as a Windows-based computing device or Windows-based developer machine. A developer machine 108 operating in software development environment 100 may perform one or more of the following functions:
    Establish communications with storage array 104, e.g., via a logical communication path 151.
    Request a snapshot of build-volume BV1, e.g., requesting storage array 104 to generate a hardware snapshot S of BV1 such as array-created snapshot S1.
    Map the snapshot S to developer machine D.
    Mount snapshot S to developer machine D.
    Use snapshot S as an NTFS volume, comprising a copy of the software base, for the developer's workspace.

Array-created build-volume BV1 (element 110) is a volume created in storage array 104 that has been designated to store a software base. Build-volume BV1 is accessible to build server 106, as indicated by the solid arrow 150. In the present example, build-volume BV1 is sized at 200 GB and is formatted for NTFS (New Technology File system from Microsoft Corp.), which is a file system (or "filesystem") that is based on and compatible with the Microsoft Windows® operating system. Thus, NTFS may be said to be a Windows-based file system. Build-volume BV1 may be of any size and may be formatted for any Windows-based file system, not necessarily NTFS.

Array-created hardware snapshots S1-Sn (elements 111-1, . . . , 111-n) are so-called "hardware snapshots" or "hardware-based snapshots," which are created by storage array 104. A snapshot is a point-in-time copy of a defined collection of data that acts as a source. A snapshot may be thought of as an instant image of source data at a given point in time (e.g., a build-volume, such as build-volume BV1, which may comprise a software base). Thus, build-volume BV1 may be thought of as the source for snapshots S1-Sn. An array-created snapshot is generated by storage array 104 in a self-contained fashion, substantially independently, using hardware, firmware and/or software residing/executing on the storage array itself. For instance, storage array 104 may be capable of performing snapshot operations upon request from another component, generally without intervention or oversight from other components, thus off-loading other components from processing needed for snapshot creation and management.

In the present example, a snapshot S (e.g., S1, . . . , Sn) is generated by storage array 104 from a source which is build-volume BV1. The snapshot S may be created in response to a command/request issued by build server 106, a developer's machine 108, or by another component (not shown here). The array-created hardware snapshot S is an exact copy of the source volume BV1.

Logical communication pathways 150 and 151 (e.g., 151-1, . . . , 151-n) may be supported by any suitable underlying physical communications infrastructure. For example, logical communication pathways 150 and 151 may include one or more networks or other connection types including one or more of the following: the Internet, a wide area network (WAN), a local area network (LAN), a Small Computer System Interface (SCSI) connection, a virtual private network (VPN), and/or other appropriate computer or telecommunications networks, combinations of the same or the like.

The present figure illustrates only a handful of snapshots S and only two developer machines D in software development environment 100. However, the number of development machines may reach well into the hundreds, each development machine D requiring its own dedicated one or more snapshots S in storage array 104. Only one build-volume BV1 is illustrated here, but a software development environment may operate with several official software bases corresponding to different releases and/or service packs, each one causing potentially hundreds of corresponding snapshots S to be created for respective developers' workspaces. The result is that the physical storage capacity of storage array 104 may be quickly exhausted and necessitate the purchase of another storage array, which is a major expense and a considerable increase in the complexity of the software development environment. This represents a substantial disadvantage of the prior-art approach depicted in FIG. 1. It would be desirable to devise a more efficient, yet robust, way to avoid or at least to slow down the growth in storage space used for providing developer workspaces.

DETAILED DESCRIPTION

Figure 1:
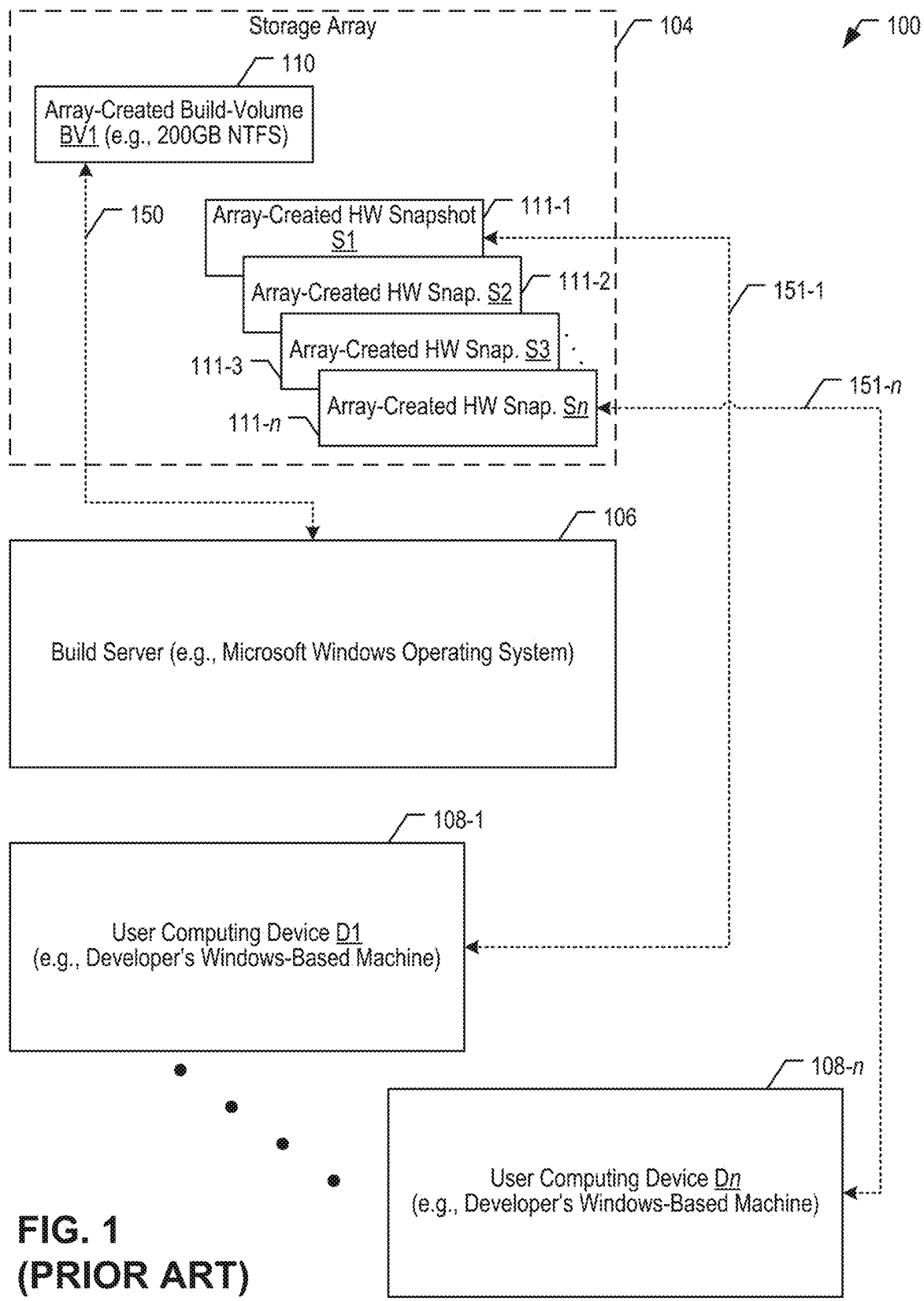
FIG. 1 depicts a prior-art approach to providing workspaces and the necessary storage therefor in a software development environment 100.

As illustrated by the prior-art approach to workspace connectivity and storage in a Windows-based software development environment, the need exists for a more efficient, yet robust, way to avoid or at least to slow the growth of storage space used for providing developer workspaces. Systems and methods are disclosed herein that use a Unix-based file system—e.g., ZFS—hosted by a Unix-based storage management server, to manage and serve clones to Windows-based computing clients, such as developer machines that need access to workspaces. The Unix-based storage management server may manage a storage volume allocated on a storage array as a ZFS pool. The Unix-based storage management server may establish a volume within the ZFS pool as a build-volume and may serve it as a logical unit number (LUN) to a Windows-based build server, which may store a software base (or "build") to the build-volume as a source for developer workspaces. The Unix-based storage management server may further establish any number of ZFS clone volumes within the ZFS pool, each ZFS clone representing a copy of the software base in the build-volume. The Unix-based storage management server may serve a ZFS clone as a logical unit number (LUN) to a respective Windows-based developer machine that requested a workspace of the software base.

The difference in actual storage space occupied on a storage device by ZFS clones versus array-created hardware snapshots is exploited in the illustrative embodiment to provide more efficient storage space utilization in the storage device. In a large software development environment, e.g., when there are hundreds of developers and/or workspaces to be provided, this difference may significantly ameliorate the immediate need for additional storage arrays.

According to the illustrative embodiment, Windows-based computing devices obtain native Windows-based access to data in a storage volume that is actually managed by the Unix-based storage management server under the ZFS volume manager and file system. The ZFS nature of the accessed storage volume is unbeknownst to the Windows-based machines. This enables Windows-based utilities, applications, and tools, e.g., software development utilities executing on the Windows-based build server or on a developer's Windows-based machine, to operate upon the data in ZFS-managed space the same as they might have operated on a workspace in an array-created hardware snapshot such as snapshot S1 in the prior art.

These applications, utilities, and tools may operate without protocol conversion between Windows and Unix and without native ZFS support on Windows-based computing devices. Accordingly, users may access storage space from their Windows-based computing devices according to a Windows-based file system such as NTFS, while the actual storage space is managed under a Unix-based file system such as ZFS volume manager and file system. Conversely, the Windows-based formatting of the contents in the ZFS-managed volumes are unbeknownst to the Unix-based storage management server and to the ZFS volume manager and file system. Since Windows and Unix operating systems are generally considered to be mutually incompatible along with any associated utilities, applications, and tools, the cross-accessibility provided by the illustrative embodiment is an important advantage.

Systems and methods are disclosed herein for using a Unix-based file system to manage and serve clones to Windows-based computing clients. Examples of such systems and methods are described in further detail in reference to FIGS. 2-8.

Figure 2:
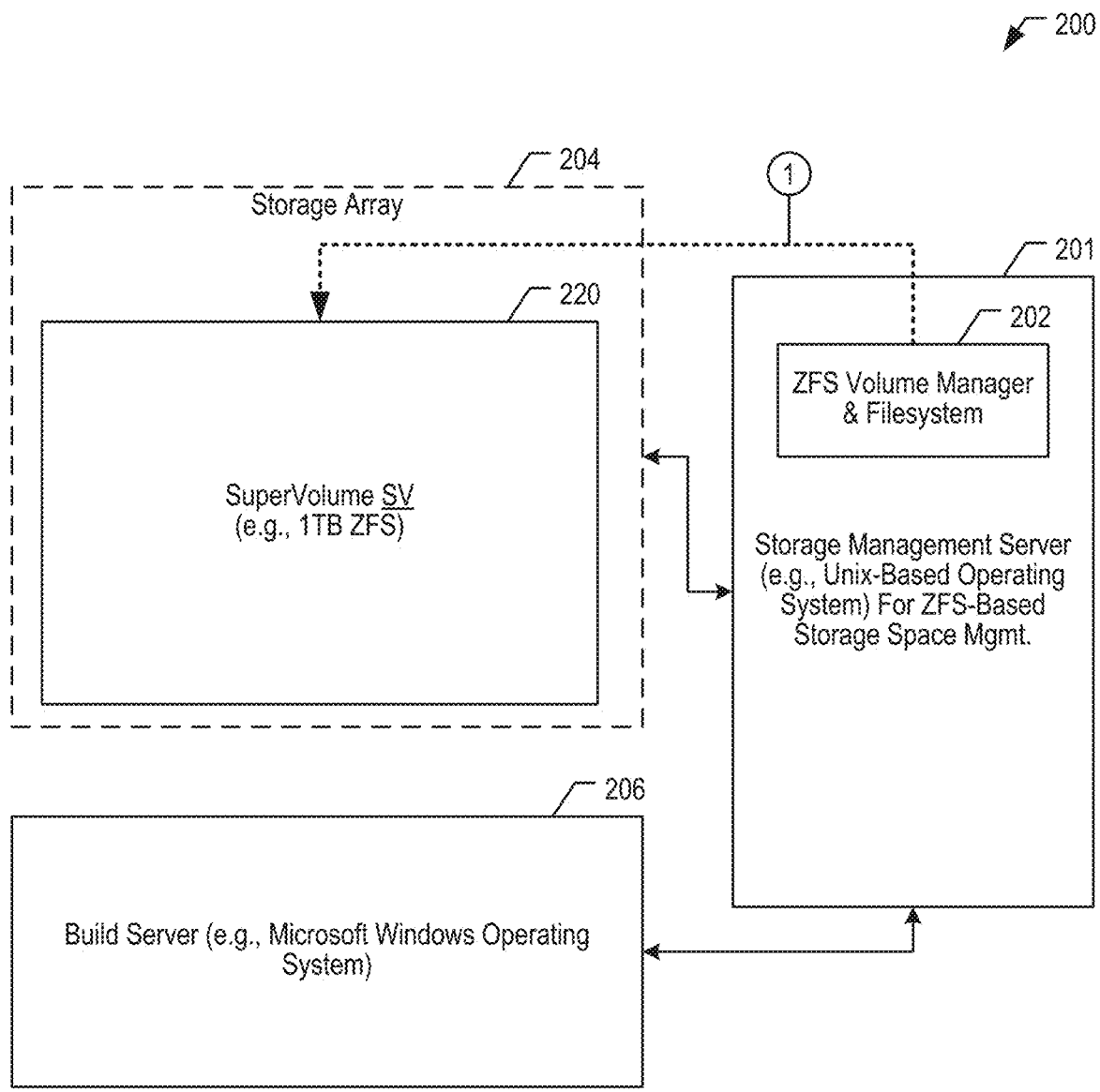
FIG. 2 depicts a system 200 for using a Unix-based file system in a Windows-based development environment to manage and serve ZFS clones to Windows-based clients, including a Unix-based storage management server 201, according to an illustrative embodiment of the present invention.

FIG. 2 depicts a system 200 for using a Unix-based file system in a Windows-based development environment to manage and serve ZFS clones to Windows-based clients, including a Unix-based storage management server 201, according to an illustrative embodiment of the present invention. FIG. 2 depicts: storage array 204, comprising supervolume SV 220; storage management server 201, comprising ZFS 202; and build server 206. Logical operation 1 is also depicted by the dotted arrow. The components may be interconnected as shown by the solid arrows; the physical infrastructure needed to support the illustrative interconnections may be any suitable communications infrastructure, which may include one or more networks or other connection types including one or more of the following, without limitation: the Internet, a wide area network (WAN), a local area network (LAN), a Small Computer System Interface (SCSI) connection, such as Internet Small Computer System Interface (iSCSI), and/or other appropriate computer or telecommunications networks, combinations of the same or the like.

Storage management server 201 may be a computing device or data processing device that operates with a Unix or Unix-like operating system, such as Linux, Solaris, AIX, etc., which are well known in the art. Thus, in the present disclosure, storage management server 201 may be said to be "Unix-based," e.g., a "Unix-based server" or a "Unix-based computing device" or a "Unix-based data processor." Storage management server 201 may be in communication with storage array 204 and with build server 206 as depicted by the solid arrows.

Component 202 may be a "ZFS" utility, which may be referred to herein simply as "ZFS 202." ZFS 202 executes on storage management server 201. ZFS (sometimes referred to herein as a "Z file system") is a Unix-based utility that provides logical volume management and also acts as a file system. ZFS 202 may be provided by Oracle Corporation of Redwood Shores, Calif., USA (formerly from Sun Microsystems), e.g., on a Solaris operating system, UNIX® operating system, Unix operating system, or on another Unix-like operating system. In some embodiments, ZFS 202 may be another version of ZFS, e.g., provided by a member of the OpenZFS organization. Storage management server 201, using ZFS 202 (or "executing ZFS 202"), may perform one or more of the following functions in system 200, without limitation:

Create a ZFS volume on storage array 204, illustratively supervolume SV (element 220). This may include formatting a raw storage volume allocated on the storage array according to the ZFS volume manager and file system 202.
  Supervolume SV 220 may be sized to accommodate a build-volume and a number of workspaces to be requested by developers. The allocated size of supervolume SV 220 may be based on predicted needs. Logic for predicting the allocated size of supervolume SV 220 may execute on storage management server 201 and/or on another computing device in system 200 (not shown here).
  Mount supervolume SV 220 as a ZFS pool on Unix-based server 201.
  Manage supervolume SV 220 under ZFS 202, based on ZFS features.
  See also FIGS. 7 and 8.

Storage array 204 may be a high capacity mass storage device that is well known in the art. Storage array 204 may comprise one or more data storage technologies, and may be any kind of block storage array, e.g., storage area network (SAN) array technologies. An example of storage array 204 may be a Dell EqualLogic™ array from Dell, Inc. Storage array 204 may comprise several storage volumes, including supervolume SV 220. Storage array 204 may be the same as or different from storage array 104, but notably the hardware snapshot feature is not required for storage array 204 and the illustrative embodiment. Thus, storage array 204 may operate in system 200 even if it lacks hardware array-created snapshot capability. Communications to/from storage array 204 may use the Internet Small Computer System Interface (iSCSI) protocol or another SCSI protocol.

Build server 206 is analogous to build server 106 described above and may comprise additional functionality for operating in system 200. In contrast to Unix-based storage management server 201, build server 206 is Windows-based, i.e., executes a Microsoft Windows operating system. In some alternative embodiments, build server 206 may execute another operating system that is analogous to Microsoft Windows or is Windows-compatible, but which is distinct from the Unix or Unix-like operating system used by storage management server 201. For example, build server 206 may perform one or more of the following functionality in system 200, without limitation:

Establish communications with storage management server 201 for access to data storage resources on storage array 204.
  Request a build-volume from and/or via storage management server 201 (e.g., build-volume BV3 310 on storage array 204, shown in FIG. 3).
  Access build-volume BV3 310 via storage management server 201.
  Map build-volume BV3 310 to build server 206.
  Mount build-volume BV3 310 to build server 206 as a logical volume number (LUN).
  Format build-volume BV3 310 according to a Windows-based file system, e.g., New Technology File system (NTFS) from Microsoft Corp., which executes on build server 206.
  Use build-volume BV3 310 as a Windows-based (e.g., NTFS) volume for storing a software base or build, e.g., build 16.
  Communicate with one or more Windows-based developer machines 108.
  See also FIGS. 7 and 8.

Supervolume SV 220 is a storage volume that physically resides on storage array 204, but which is defined, formatted, and managed by storage management server 201, e.g., using ZFS 202. In contrast to the prior art, where build-volume BV1 was created by storage array 204 in response to build server 106 using a Windows-based file system, supervolume SV 220 is sized to accommodate numerous workspaces and is managed as a ZFS volume by a Unix-based machine such as storage management server 201. Thus, logically, supervolume SV 220 is associated with Unix-based storage management server 201. Illustratively, supervolume SV 220 may be sized at 1 TB, based on a build-volume of 200 GB.

Logical operation 1, depicted by the dotted arrow, illustrates storage management server 201 (e.g., using ZFS 202) establishing supervolume SV 220 on storage array 204. This operation may include communicating with storage array 204, creating the volume, formatting the volume for ZFS, mounting it as a ZFS Pool on server 201, etc. See also FIG. 7.

Figure 3:
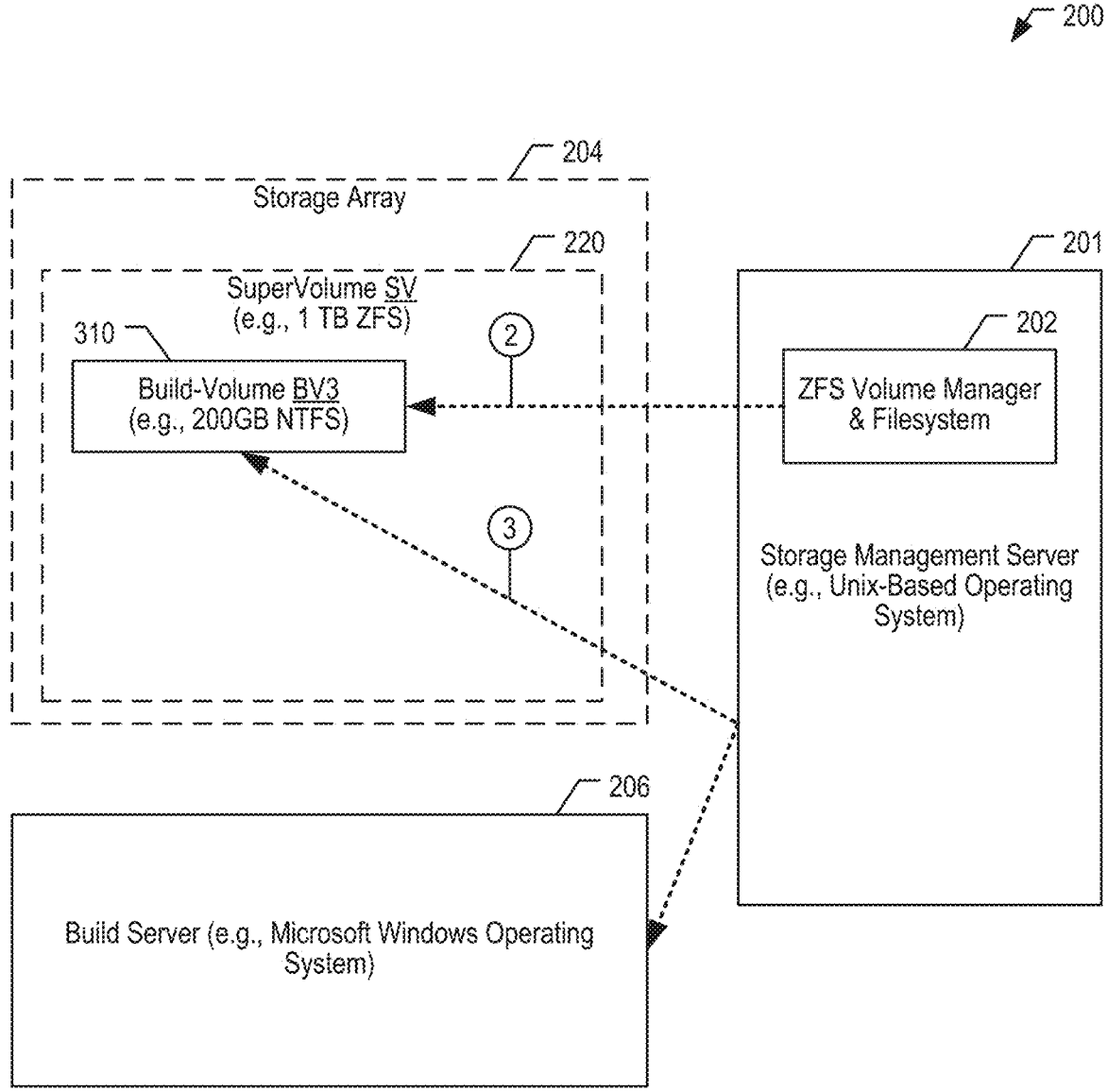
FIG. 3 depicts additional details of system 200.

FIG. 3 depicts additional details of system 200, including logical operations 2 and 3 illustrated by the dotted arrows, and build-volume BV3 (element 310).

Logical operation 2 illustrates storage management server 201 (e.g., using ZFS 202) establishing build-volume BV3 (element 310) within the ZFS Pool of supervolume SV 220. This is a ZFS operation according to features provided by ZFS 202, e.g., naming the build-volume, allocating a size, e.g., 200 GB, etc. This operation may be performed in response to a request from build server 206 asking for a build-volume.

Logical operation 3 illustrates build server 206 establishing a communicative coupling with build-volume BV3 310—via storage management server 201. Thus, according to the illustrative embodiment, storage management server 201 may be responsible, at least in part, for providing communicative coupling between build server 206 and the build-volume BV3 310. This functionality may be provided by special-purpose code that executes on storage management server 201. Accordingly, storage management server 201 may serve and/or present build-volume BV3 as a "blank" logical unit number (LUN) to build server 206. Windows-based build server 206 may then treat build-volume BV3 310 as any other storage volume accessible as a LUN, yet the storage space occupied by build-volume BV3 310 is managed as ZFS space. Storage management server 201 may treat each volume in the ZFS pool as an individual iSCSI target. Furthermore, storage management server 201 may provide to build server 206 an iSCSI initiator address to use with the particular iSCSI target, such as build-volume BV3 310.

Once communicative coupling has been established between build server 206 and build-volume BV3 310, build server 206 may access build-volume BV3 via storage management server 201, e.g., using iSCSI protocol; may map BV3 to build server 206; may mount BV3 to build server 206 as a LUN and format BV3 according to a Windows-based file system, e.g., NTFS and may use BV3 as an NTFS volume going forward. The Windows-based build server 206 lacks any awareness that build-volume BV3 310 was established and/or is managed by a ZFS file system, such as ZFS 202, e.g., build server 206 lacks any configuration settings/parameters, administration settings/parameters, feature activation, and/or protocol conversion, etc. relative to the ZFS nature of build-volume BV3 310. Windows-based build server 206 is not configured for ZFS nor does it natively support ZFS. Instead, Windows-based build server 206 may access build-volume BV3 310 based on a Windows operating system and Windows-based file system (e.g., NTFS) that execute on the Windows-based server 206. Windows-based build server 206 may write data to and/or read data from build-volume BV3 310, e.g., build server 206 may store a software base or a software build to BV3. See also FIG. 7.

Build-volume BV3 (element 310) illustratively comprises a software base and acts as a source for ZFS clones that are to be used for workspaces. Supervolume SV 220 may comprise any number of distinct build-volumes such as BV3, each build-volume comprising a software base, and each build-volume acting as a source for respective workspaces.

Figure 4:
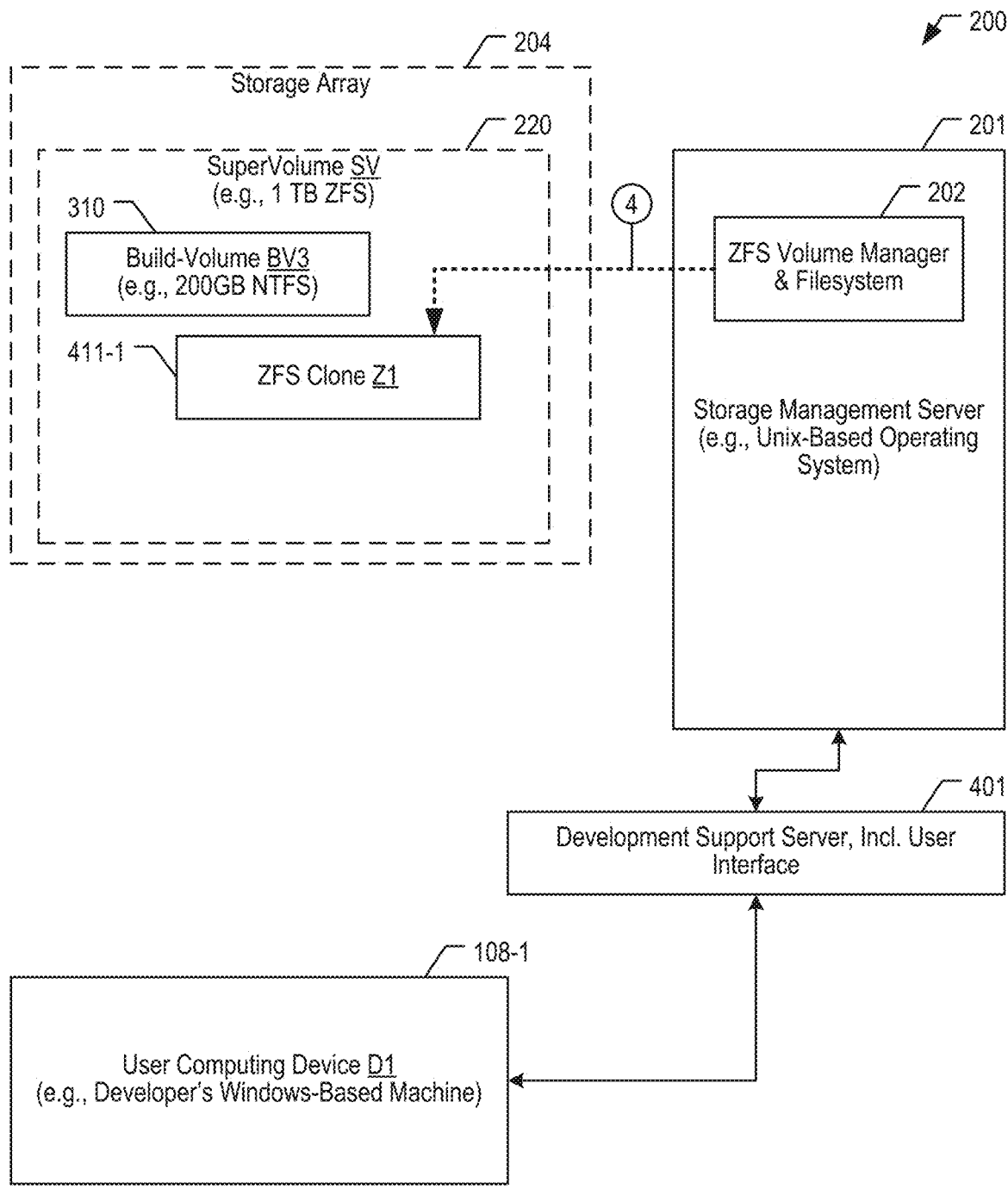
FIG. 4 depicts additional details of system 200.

FIG. 4 depicts additional details of system 200, including logical operation 4 illustrated by the dotted arrows. FIG. 4 additionally depicts: development support server 401; and ZFS clone Z1 (element 411-1).

Development support server 401 may be a computing device and/or data processor that may also include a user interface for developer access to the development environment in system 200. Development support server 401 may be in communication with storage management server 201 and also with one or more developer Windows-based machines D, e.g., D1 shown here (component 108-1). Development support server 401 may rely on a web-based interface that provides developers with utilities to request and configure workspaces in system 200 as needed. The utilities may interoperate with storage management server 201 to respond to developers' requests for workspaces.

For example, based on the present illustrative configuration, a user/developer may request a workspace of the build-volume BV3, which contains a certain software build of interest to the developer, e.g., build 16. The developer may request any number of workspaces in reference to other build-volumes, analogous to BV3, that may be available on storage array 204 or on another storage device in system 200 (not shown). Although development support server 401 is shown here as a separate computing device, distinct from component 201, in some alternative embodiments, the functionality of development support server 401 may be provided by storage management server 201 and/or by build server 206.

ZFS clone Z1 (element 411-1) represents a copy of build-volume BV3, and may be generated by ZFS volume manager and file system 202. ZFS clone Z1 is part of the same ZFS pool as the source volume, i.e., build-volume BV3. ZFS volume manager and file system 202 may create any number of ZFS clones Z within the ZFS pool—within the constraints of ZFS features and storage array capacities.

Logical operation 4 illustrates the Unix-based storage management server 201 (e.g., using ZFS volume manager and file system 202) creating a ZFS clone of build-volume BV3, illustratively designated ZFS clone Z1 (element 411-1). This operation may occur in response to a request issued by user computing device D1, and may be received via development support server 401. See also FIG. 8.

A ZFS clone such as ZFS clone Z1 may occupy substantially less physical storage space than an array-created hardware snapshot such as S1, because ZFS clones may use virtual space allocation to represent a copy of data from the source volume—as managed by the ZFS volume manager and file system 202. Thus, a ZFS clone may represent a copy of a source volume, such as BV3, from which the Z1 clone is cloned, yet the ZFS clone may take up less physical space than a full image of the source that may be provided by an array-created hardware snapshot such as S1.

Figure 5:
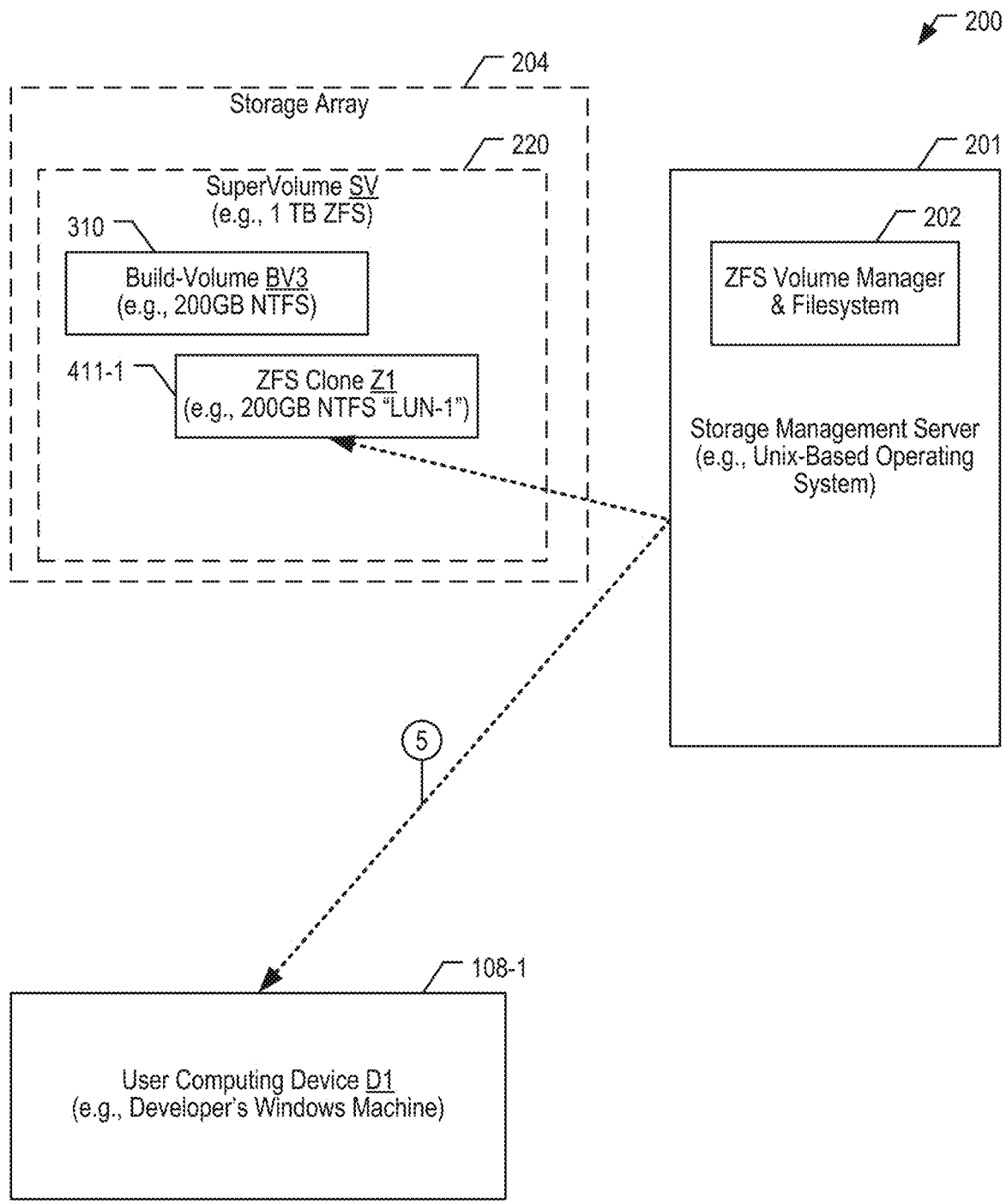
FIG. 5 depicts additional details of system 200.

FIG. 5 depicts additional details of system 200, including logical operation 5 illustrated by the dotted arrows.

Logical operation 5 depicts the Unix-based storage management server 201 serving and/or presenting ZFS clone Z1 (element 411-1) as a logical unit number (LUN), illustratively designated "LUN-1," to a Windows-based computing device such as user computing device 108-1. This is accomplished in part by providing a communicative coupling between the Windows-based computing device (e.g., 108-1)

and LUN-1—via the Unix-based storage management server 201. See also logical operation 3.

Windows-based computing device 108-1 may access (via the Unix-based storage management server 201) the data in the storage volume mounted as LUN-1 without any awareness that the volume designated LUN-1 was set up under ZFS, e.g., computing device 108-1 lacks any configuration settings/parameters, administration settings/parameters, feature activation, and/or protocol conversion, etc. relative to the ZFS nature of the storage space designated by LUN-1. Windows-based computing device 108-1 is not configured for ZFS nor does it natively support ZFS. Instead, Windows-based computing device 108-1 may perform, natively based on a Windows operating system and Windows-based file system (e.g., NTFS), one or more of the following functionality without limitation: map the cloned volume 411-1 and mount it as a logical unit number, e.g., LUN-1; access data in LUN-1, which was cloned from source volume BV3 in logical operation 4, and recognize file system metadata therein, e.g., indicating that this is an NTFS volume same as the source volume BV3. The developer's Windows-based machine 108 now has access, via the Unix-based storage management server 201, to a workspace that is a copy of the source build-volume BV3.

At this point, Windows-based computing device 108-1 has obtained native Windows-based access to data in a storage volume that is actually managed by the Unix-based storage management server 201 as a ZFS clone in a ZFS pool. The ZFS nature of the accessed storage volume is unbeknownst to the Windows-based developer's machine. This enables Windows-based utilities, applications, and tools, e.g., software development utilities executing on the developer's Windows-based machine 108-1, to operate upon the data in LUN-1 (really ZFS clone Z1) the same as they might have operated on a workspace in an array-created hardware snapshot such as snapshot S1 in the prior art. No protocol conversion between Windows and Unix is required according to the illustrative embodiment. Native ZFS support on Windows-based computing devices also is not required. Accordingly, users may access/use storage space from their Windows-based computing devices (e.g., 108) according to a Windows-based file system such as NTFS, while the actual storage space is managed under a Unix-based file system such as ZFS volume manager and file system 202.

Figure 6:
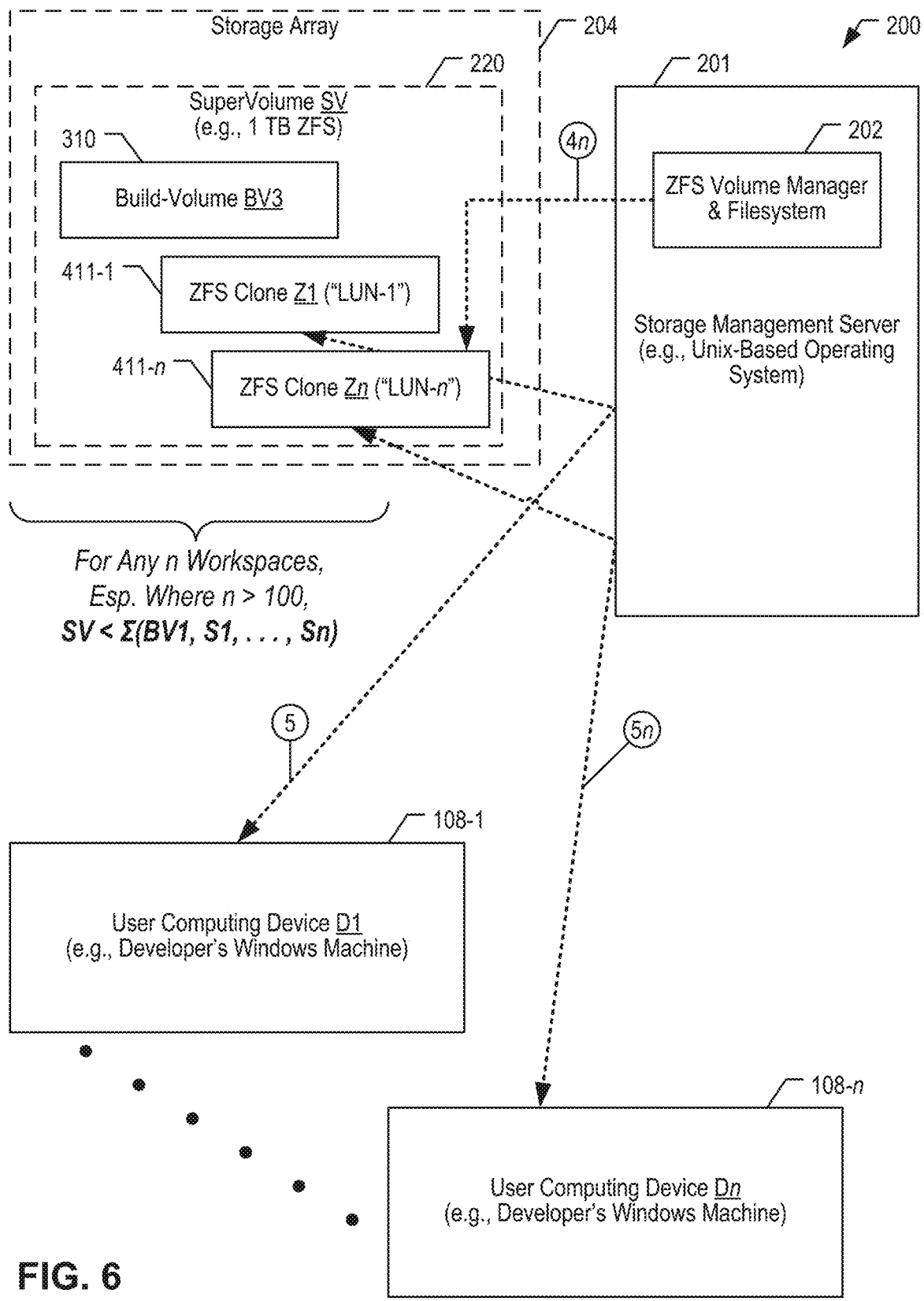
FIG. 6 depicts additional details of system 200.

FIG. 6 depicts additional details of system 200, including additional ZFS clones (e.g., Zn) and access thereto by corresponding Windows-based computing devices (e.g., 108-n). Logical operations 4n, 5, and 5n are illustrated by the dotted arrows.

User computing device 108-n (developer's machine Dn) is a Windows-based computing device analogous to component 108-1. System 200 may comprise any number of Windows-based computing devices 108.

ZFS clone Zn (element 411-n) is analogous to ZFS clone Z1 (element 411-1) and is likewise created within a ZFS pool by storage management server 201, e.g., using ZFS volume manager and file system 202. This is illustrated by logical operation 4n, which is analogous to logical operation 4 described in more detail elsewhere herein. Storage management server 201 may create any number of ZFS clones Z within the ZFS pool, subject to ZFS features and actual storage capacity on storage array 204.

Logical operation 5n is analogous to operation 5 described in more detail elsewhere herein. ZFS clone Zn is served as "LUN-n" to Windows-based user computing device 108-n. Storage management server 201 may execute and/or participate in any number of logical operations 5 according to the illustrative embodiment.

FIG. 6 also indicates that, in general, it may be expected that for any n workspaces supplied from a respective ZFS clone Z to a respective Windows-based user computing device D (e.g., 108), according to the illustrative embodiment, the total amount of actual storage occupied by the ZFS-managed volume (e.g., supervolume SV 220, which includes build-volume BV3 and n ZFS clones Z1-Zn) will be less than the sum of actual storage space that might have been occupied by a prior-art solution that includes a source volume BV1 and n array-created hardware snapshots S1-Sn. As explained herein, the illustrative embodiment exploits ZFS space management efficiencies to provide access to ZFS-managed storage volumes to any number of Windows-based clients, such as Windows-based build server 206 and Windows-based computing devices 108.

Figure 7:
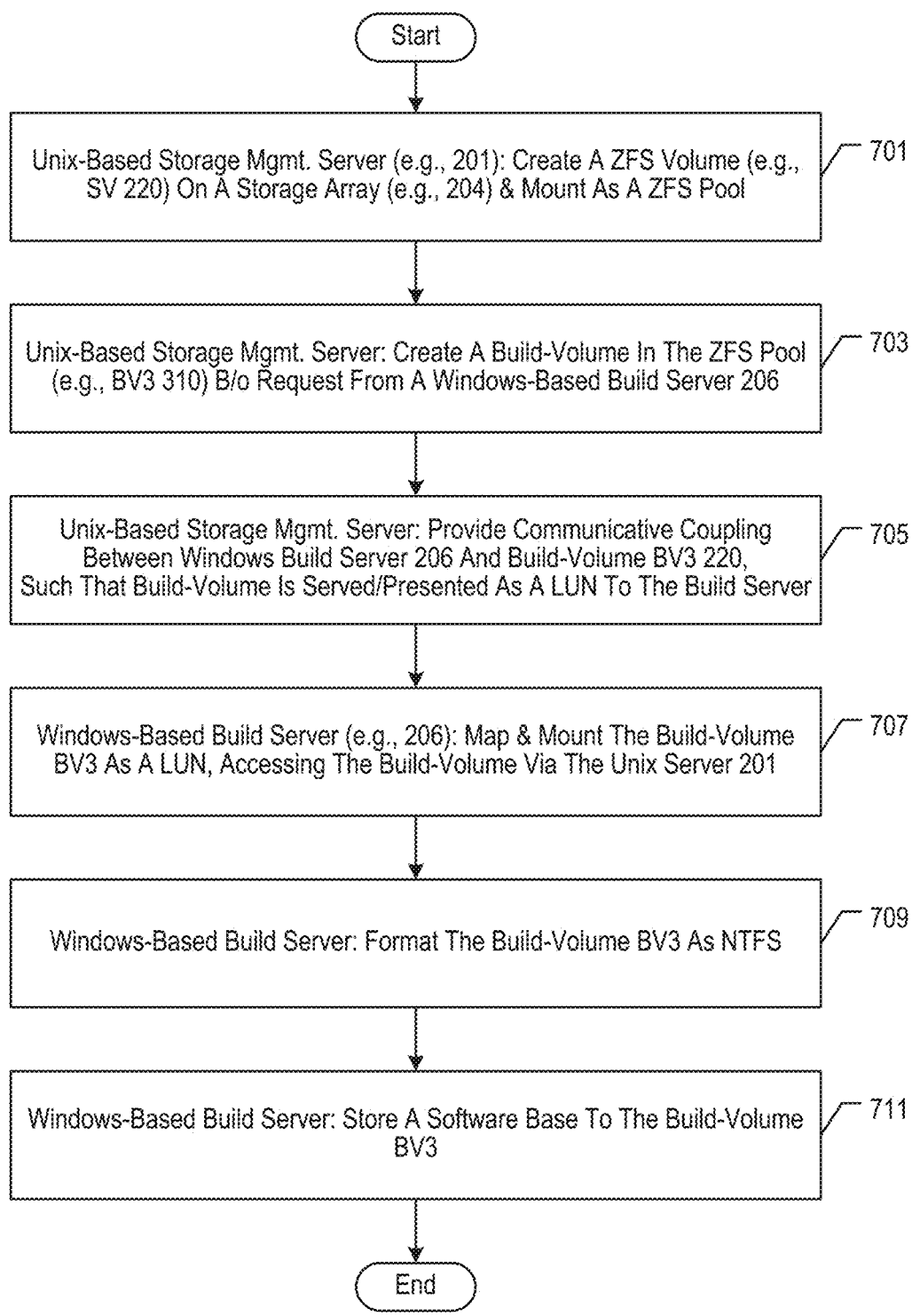
FIG. 7 depicts some salient operations of a method 700 according to an illustrative embodiment of the present invention.

FIG. 7 depicts some salient operations of a method 700 according to an illustrative embodiment of the present invention. Method 700 may be executed by one or more components of system 200, as described in more detail herein.

At block 701, a raw volume in a storage array (e.g., 204) may be mounted to a Unix-based computing device such as storage management server 201 and may be formatted as a ZFS volume and a ZFS pool may be created, e.g., supervolume 220, by the Unix-based computing device 201, e.g., using ZFS volume manager and file system 202 executing thereon. See also FIG. 2 and logical operation 1.

At block 703, the Unix-based storage management server 201 may create a build-volume in the ZFS pool, e.g., build-volume BV3 (element 310). This operation may occur in response to a request and/or instruction received from a Windows-based computing device such as build server 206. See also FIG. 3 and logical operation 2.

At block 705, the Unix-based storage management server 201 may provide communicative coupling between Windows-based build server 206 and build-volume BV3, such that build-volume BV3 is presented and/or served as a logical unit number (LUN) to build server 206. See also FIG. 3 and logical operation 3.

At block 707, the Windows-based build server 206 may map and mount the logical unit number (LUN) served in the preceding operation, thus accessing build-volume BV3 via storage management server 201. See also FIG. 3 and logical operation 3.

At block 709, the Windows-based build server 206 may access build-volume BV3 using a Windows-based file system, e.g., NTFS, and may format build-volume BV3 accordingly, e.g., as an NTFS volume. See also FIG. 3 and logical operation 3.

At block 711, having established build-volume BV3 as an accessible Windows-based volume, e.g., NTFS, Windows-based build server 206 may now use build-volume BV3. One illustrative use is to store a software base to build-volume BV3, e.g., build 16. Build-volume BV3 will now act as a source volume for workspaces requested by developers. See also FIG. 3 and logical operation 3.

Figure 8:
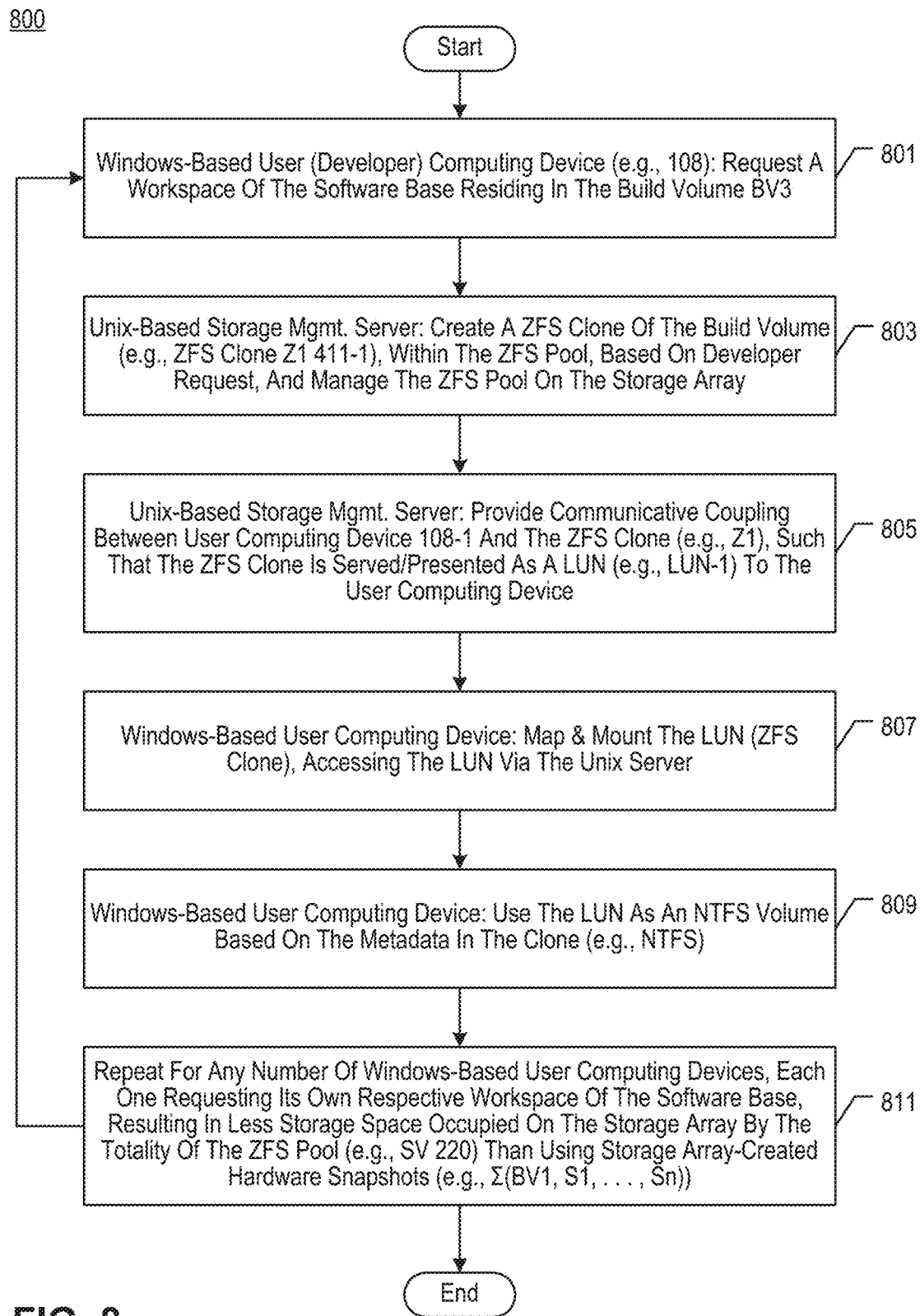
FIG. 8 depicts some salient operations of a method 800 according to an illustrative embodiment of the present invention.

FIG. 8 depicts some salient operations of a method 800 according to an illustrative embodiment of the present invention. Method 800 may be executed by one or more components of system 200, as described in more detail herein. Method 800 may occur after method 700.

At block 801, a Windows-based computing device such as Windows-based user computing device (developer's machine) 108 (e.g., 108-1) may request a workspace of a particular software base, such as, illustratively, build 16 stored in build-volume BV3. The request may be entered by a user (developer) via a user interface. The request may be transmitted as a request and/or instruction to Unix-based storage management server 201, directly, or in some embodiments indirectly, e.g., via development support server 401, which is in communication with storage management server 201. See also FIG. 4.

At block 803, Unix-based storage management server 201 (e.g., using ZFS volume manager and file system 202) may create, in response to the preceding request, a ZFS clone within the ZFS pool created at operation 701, e.g., stored in supervolume SV 220. The ZFS clone, such as ZFS clone Z1, may be managed according to ZFS features within the ZFS pool. See also FIG. 4 and logical operation 4.

At block 805, the Unix-based storage management server 201 may provide communicative coupling between the requesting Windows-based computing device 108-1 and ZFS clone Z1, such that the ZFS clone Z1 is presented and/or served as a logical unit number (illustratively "LUN-1") to the Windows-based computing device 108-1. See also FIG. 5 and logical operation 5.

At block 807, the Windows-based computing device 108-1 may map and mount the logical unit number served in the preceding operation (LUN-1), thus accessing ZFS clone Z1 via storage management server 201. See also FIG. 5 and logical operation 5.

At block 809, the Windows-based computing device 108-1 using its own native Windows-based file system, e.g., NTFS, may access the data in LUN-1 based at least in part on the metadata in LUN-1 which was ZFS-cloned from the NTFS source volume BV3. The developer may now use the copy of software base from LUN-1 as a workspace, using native Windows-based applications, utilities, and/or tools executing on Windows-based computing device 108-1. See also FIG. 5 and logical operation 5.

At block 811, the operations 801-809 may be repeated any number of times for any number of Windows-based computing devices 108, each requesting its own respective workspace(s) of the software base in build-volume BV3 (and/or in other similar ZFS-based build-volumes in storage array 204). As explained, the result is that less actual storage space may be occupied on the storage array by the totality of the ZFS pool (e.g., SV 220) than using storage array-created hardware snapshots in the prior art (e.g., Σ(BV1, S1, . . . , Sn)). See also FIG. 6 and logical operations 4n and 5n.

System 200 may support any number of software bases and any number of build-volumes such as BV3. Storage management server 201 may establish these other build-volumes in the same ZFS pool as supervolume 220 or in a separate ZFS pool comprising its own allocated storage on storage array 204, or any combination thereof, without limitation. System 200 may also support any number of workspace requests from any number of developers' Windows-based computing devices 108.

In regard to the components, blocks, operations and/or sub-operations described in reference to FIGS. 2-8, other embodiments are possible within the scope of the present invention, such that the above-recited components, steps, blocks, operations, sub-operations and/or messages/requests/queries/instructions may be differently arranged, sequenced, sub-divided, organized, and/or combined. In some embodiments, a different component may initiate or execute a given operation.

Example Embodiments

According to an example embodiment, a system for using a Unix-based Z file system (ZFS file system) in a Windows-based computing environment may comprise: a Unix-based computing device for managing storage space as a ZFS file system; a storage array comprising the storage space managed as a ZFS file system by the Unix-based computing device; a Windows-based server in communication with the Unix-based computing device; wherein the Unix-based computing device is configured to: create a first volume on the storage array, mount the first volume as a ZFS pool, create a second volume within the ZFS pool, and provide a communicative coupling between the Windows-based server and the second volume, such that the second volume is presented as a first logical unit number (LUN) to the Windows-based server; wherein the Windows-based server is configured to: mount the first LUN, access the second volume represented by the first LUN, format the second volume according to a Windows-based file system, wherein metadata stored to the second volume indicates that the second volume is formatted as a Windows-based file system, and wherein the Windows-based server lacks any configuration that indicates that the second volume was created within a ZFS pool; and wherein the Unix-based computing device lacks any configuration that indicates that the second volume within the ZFS pool has been formatted by the Windows-based server according to the Windows-based file system. The above-recited system wherein the Unix-based computing device is further configured to manage the first volume as a ZFS pool in the ZFS file system. The above-recited system wherein the Windows-based server is configured to use the second volume stored in the storage array as a volume within the Windows-based file system, wherein the second volume was created, by the Unix-based computing device, within the ZFS pool.

According to one example embodiment, a tangible non-transitory computer-readable storage medium may store instructions, which when implemented by at least one Unix-based computing device, perform a method for using a Unix-based ZFS file system in a Windows-based computing environment, the method comprising: managing a storage volume stored in a storage array under a ZFS file system that executes on the Unix-based computing device; mounting the storage volume as a ZFS pool on the Unix-based computing device; creating a second volume within the ZFS pool, based at least in part on a request received from a Windows-based server; and providing a communicative coupling between the Windows-based server and the second volume, such that the second volume is served as a first logical unit number (LUN) to the Windows-based server, wherein the Windows-based server lacks native support for the ZFS file system. The above-recited tangible non-transitory computer-readable storage medium, wherein the method further comprises: creating a third volume as a first ZFS clone of the second volume, within the ZFS pool, based at least in part on a request issued by a first Windows-based computing device that is distinct from the Windows-based server, wherein the third volume comprises a copy of first data cloned from the second volume; and providing, a communicative coupling between the first Windows-based computing device and the third volume, such that the third volume is served as a second LUN to the first Windows-based computing device, wherein the first Windows-based computing device lacks native support for the ZFS file system.

According to another exemplary embodiment, a tangible computer-readable storage medium whose contents may cause a system comprising a Unix-based computing device to perform a method for using a Unix-based ZFS file system in a Windows-based computing environment, the method comprising: managing a storage volume stored in a storage array under a ZFS file system that executes on the Unix-based computing device; mounting the first volume as a ZFS pool on the Unix-based computing device; creating a second volume within the ZFS pool, based at least in part on a request received from a Windows-based server; and providing a communicative coupling between the Windows-based server and the second volume, such that the second volume is served as a first logical unit number (LUN) to the Windows-based server, wherein the Windows-based server lacks native support for the ZFS file system. The above-recited tangible computer-readable storage medium wherein the method further comprises: creating a third volume as a first ZFS clone of the second volume, within the ZFS pool, based at least in part on a request issued by a first Windows-based computing device that is distinct from the Windows-based server, wherein the third volume comprises a copy of first data cloned from the second volume; and providing, a communicative coupling between the first Windows-based computing device and the third volume, such that the third volume is served as a second LUN to the first Windows-based computing device, wherein the first Windows-based computing device lacks native support for the ZFS file system.

According to another embodiment, a method for using a Unix-based ZFS file system in a Windows-based computing environment may comprise: managing a storage volume stored in a storage array under the Unix-based ZFS file system that executes on a Unix-based computing device; mounting the storage volume as a ZFS pool on the Unix-based computing device; creating, by the Unix-based computing device, a second volume within the ZFS pool; providing, by the Unix-based computing device, a communicative coupling between the Windows-based server and the second volume, such that the second volume is presented as a first logical unit number (LUN) to the Windows-based server; mounting the first LUN to the Windows-based server; accessing the second volume by the Windows-based server via the Unix-based computing device; formatting the second volume, by a Windows-based file system that executes on the Windows-based server; storing to the second volume first data that is generated by the Windows-based server; creating, by the Unix-based computing device executing the Unix-based ZFS file system, a third volume as a first ZFS clone of the second volume, within the ZFS pool, based at least in part on a request received from a first Windows-based computing device that is distinct from the Windows-based server, wherein the third volume comprises a copy of the first data cloned from the second volume; providing, by the Unix-based computing device, a communicative coupling between the first Windows-based computing device and the third volume, such that the third volume is presented as a second LUN to the first Windows-based computing device; mounting the second LUN to the first Windows-based computing device; accessing the third volume by the Windows-based computing device via the Unix-based computing device; and using the third volume under the Windows-based file system, based on metadata which is cloned from the second volume, which metadata indicates that the third volume is formatted according to the Windows-based file system, wherein the using of the third volume comprises accessing, by the Windows-based computing device, the copy of the first data cloned to the third volume.

The above-recited method wherein the first data comprises a first software base generated by the Windows-based server; and accessing the first software base, by the first Windows-based computing device, as a workspace in the third volume. The above-recited method wherein the first Windows-based computing device lacks any configuration that indicates that the second volume was created within a ZFS pool; and wherein the Unix-based computing device lacks any configuration that indicates that the second volume within the ZFS pool has been formatted by the Windows-based server according to the Windows-based file system. The above-recited method wherein the first Windows-based computing device lacks any configuration that indicates that the third volume was created as a ZFS clone within a ZFS pool.

According to another illustrative embodiment, a method may comprise: creating a first volume stored in a storage array, by a Unix-based computing device that executes a Z file system (ZFS), wherein the first volume is created under the ZFS file system; mounting the first volume as a ZFS pool on the Unix-based computing device; creating, by the Unix-based computing device, a second volume within the ZFS pool; providing, by the Unix-based computing device, a communicative coupling between the Windows-based server and the second volume, such that the second volume is presented as a first logical unit number (LUN) to the Windows-based server; formatting the second volume, by a Windows-based file system that executes on the Windows-based server, according to the Windows-based file system; storing to the second volume first data that is generated by the Windows-based server; creating, by the Unix-based computing device, a third volume as a first ZFS clone of the second volume, within the ZFS pool, wherein the third volume comprises a copy of the first data cloned from the second volume; providing, by the Unix-based computing device, a communicative coupling between the third volume on the storage array and a first Windows-based computing device that is distinct from the Windows-based server, such that the third volume is presented as a second LUN to the first Windows-based computing device; and using the third volume under the Windows-based file system, based on metadata which is cloned from the second volume, which metadata indicates that the third volume is formatted according to the Windows-based file system, wherein the using of the third volume comprises accessing, by the Windows-based computing device, the copy of the first data cloned to the third volume; wherein the first Windows-based computing device lacks any configuration that indicates that the second volume and third volume were created within a ZFS pool and also lacks native support for the ZFS file system; and wherein the Unix-based computing device lacks any configuration that indicates that the second volume within the ZFS pool has been formatted by the Windows-based server according to the Windows-based file system.

The above-recited method wherein the first data comprises a first software base generated by the Windows-based server; and accessing the first software base, by the first Windows-based computing device, as a workspace in the third volume. The above-recited method wherein the Unix-based computing device creates the first ZFS clone in response to a request issued by the first Windows-based computing device.

According to yet another embodiment, a method for using a Unix-based ZFS file system in a Windows-based computing environment may comprise: accessing a first storage volume from a Windows-based computing device using a Windows-based file system executing on the Windows-based computing device; wherein the first storage volume is mounted as a first logical unit number (LUN) to the Windows-based computing device; and wherein the first storage volume is part of a ZFS pool managed under a ZFS file system by a Unix-based computing device, Unix-based computing device which is communicatively coupled to the Windows-based computing device and to a storage device that hosts the storage space allocated to the ZFS pool; and wherein the Windows-based computing device lacks native support for the ZFS file system; and wherein the Windows-based computing accessing the first storage volume device lacks any configuration that indicates that the first storage volume is part of a ZFS pool managed by the Unix-based computing device.

The above-recited method further comprising: issuing a request for a copy of the first storage volume, wherein the request is issued by a Windows-based computing device is one of: the same as the Windows-based computing device accessing the first storage volume, and another Windows-based computing device which is also communicatively coupled to the Unix-based computing device; creating by the Unix-based computing device, in response to the request, a ZFS clone of the first storage volume, wherein the ZFS clone is also part of the ZFS pool, and wherein the ZFS clone represents the requested copy of the first storage volume; and presenting the ZFS clone to the requesting Windows-based computing device as a second logical unit number (LUN) to be mounted to the requesting Windows-based computing device, wherein the Windows-based computing device lacks native support for the ZFS file system. The above-recited method further comprising: mounting the second logical unit number (LUN) to the requesting Windows-based computing device; and accessing, by the requesting Window-based computing device, the requested copy of the first storage volume in the second logical unit number (LUN); wherein the requesting Windows-based computing device lacks any configuration that indicates that storage space represented by the second logical unit number (LUN) is managed by the Unix-based computing device as part of a ZFS pool.

According to another example embodiment, a system for using a Unix-based ZFS file system in a Windows-based computing environment may comprise: a storage array comprising a storage space; a Unix-based computing device for managing the storage space on the storage array as a ZFS file system; wherein the Unix-based computing device is configured to: create a first volume under the ZFS file system, which first volume is stored on the storage array, mount the first volume as a ZFS pool, create a second volume within the ZFS pool, and present the second volume as a first logical unit number (LUN) to a first Windows-based computing device; the first Windows-based computing device in communication with the Unix-based computing device; and wherein the first Windows-based computing device is configured to: mount the first logical unit number (LUN), and access the second volume under a Windows-based file system executing on the first Windows-based computing device.

The above-recited system wherein the Unix-based computing device is further configured to: create a ZFS clone of the first storage volume, wherein the ZFS clone is also part of the ZFS pool, and wherein the ZFS clone represents a copy of the second volume; and present the ZFS clone to a second Windows-based computing device as a second logical unit number (LUN). The above-recited system wherein the Unix-based computing device is further configured to: create a ZFS clone of the first storage volume, wherein the ZFS clone is also part of the ZFS pool, and wherein the ZFS clone represents a copy of the second volume; and present the ZFS clone to a second Windows-based computing device as a second logical unit number (LUN); and the second Windows-based computing device in communication with the Unix-based computing device, wherein the second Windows-based computing device is configured to: mount the second logical unit number (LUN), and access the copy of the second volume under a Windows-based file system executing on the second Windows-based computing device.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method for using a Unix-based Z file system (ZFS file system) in a Windows-based computing environment, the method comprising:
   by a Unix-based computing device that executes a Unix-based ZFS file system, configuring a first volume in a block storage array that is communicatively coupled to the Unix-based computing device;
   by the Unix-based computing device mounting the first volume as a ZFS pool;
   by the Unix-based computing device configuring a second volume within the ZFS pool;
   by the Unix-based computing device, presenting the second volume, which is configured within the ZFS pool, as a first logical unit number (LUN) to a first Windows-based computing device that executes a Windows-based file system;
   by the first Windows-based computing device mounting the first LUN as block data storage;
   by the first Windows-based computing device accessing the second volume mounted as the first LUN via the Unix-based computing device;
   by the first Windows-based computing device executing the Windows-based file system, formatting the second volume mounted as the first LUN according to the Windows-based file system; and
   by the first Windows-based computing device obtaining native Windows-based access to data stored in the second volume according to the Windows-based file system, wherein the second volume is configured by the Unix-based computing device within the ZFS pool, and wherein the native Windows-based access is obtained without protocol conversion between the Windows-based file system and the Unix-based ZFS file system.

2. The method of claim 1 wherein the first Windows-based computing device lacks an indication that the second volume is configured within the ZFS pool, and wherein the Unix-based computing device lacks an indication that the second volume within the ZFS pool has been formatted by the first Windows-based computing device according to the Windows-based file system.

3. The method of claim 1 wherein the first Windows-based computing device interacts with the second volume as block data storage under the Windows-based file system.

4. The method of claim 1 wherein the Windows-based file system is New Technology File System (NTFS).

5. The method of claim 1 wherein the Unix-based computing device executes a Linux operating system.

6. The method of claim 1 wherein the formatting of the second volume according to the Windows-based file system comprises storing metadata to the second volume that indicates that the second volume is formatted according to the Windows-based file system.

7. The method of claim 1 further comprising:
   by the Unix-based computing device executing the Unix-based ZFS file system, configuring within the ZFS pool a third volume as a first ZFS clone of the second volume;
   by the Unix-based computing device presenting the third volume as a second logical unit number (LUN) to a second Windows-based computing device that is distinct from the first Windows-based computing device;
   by the second Windows-based computing device mounting the second LUN as block data storage;
   by the second Windows-based computing device accessing the third volume mounted as the second LUN via the Unix-based computing device;
   by the second Windows-based computing device executing the Windows-based file system, formatting the third volume mounted as the second LUN according to the Windows-based file system; and
   by the second Windows-based computing device executing the Windows-based file system, using the third volume as data storage compatible with the Windows-based file system, based on metadata in the third volume which is cloned from the second volume, which metadata indicates that the third volume is formatted according to the Windows-based file system.

8. A system for using a first file system in a computing environment that is based on a second file system, the system comprising:
   a first computing device for managing storage space under a first file system, wherein the first computing device executes a first operating system, and
   wherein the first computing device is in communication with a block storage array comprising the storage space managed under the first file system by the first computing device;
   a second computing device in communication with the first computing device, wherein the second computing device executes a second operating system that is incompatible with the first operating system and uses a second file system that differs from the first file system;
   wherein the first computing device is configured to:
   configure in the block storage array a first volume as a Unix-based Z file system (ZFS) pool,
   configure a second volume within the ZFS pool, and
   present the second volume configured within the ZFS pool as a first logical unit number (LUN) to the second computing device that uses the second file system; and
   wherein the second computing device is configured to:
   mount the first LUN as block data storage,
   access the second volume mounted as the first LUN via the first computing device,
   format the second volume mounted as the first LUN according to the second file system, which includes storing metadata to the second volume,
   wherein the second computing device lacks an indication that the second volume is configured within the ZFS pool, and
   obtain native file system access to data stored in the second volume configured within the ZFS pool without protocol conversion by the first computing device between the second file system and the first file system.

9. The system of claim 8 wherein the second computing device is further configured to use the second volume stored in the block storage array as a data storage volume under the second file system.

10. The system of claim 8 wherein the first file system is a Unix-based Z file system (ZFS file system).

11. The system of claim 8 wherein the first operating system is Unix-based.

12. The system of claim 8 wherein the second file system is New Technology File System (NTFS).

13. The system of claim 8 wherein the first computing device lacks an indication that the second volume within the ZFS pool has been formatted by the second computing device according to the second file system.

14. The sysem of claim 8 wherein the first computing device manages the ZFS pool under the first file system.

15. The system of claim 8 wherein the second computing device interacts with the second volume as block data storage under the second file system.

16. A system for using a Unix-based Z file system (ZFS file system) in a Windows-based computing environment, the system comprising:
   a Unix-based computing device for using the Unix-based ZFS file system to manage storage space on a block storage array;
   wherein the Unix-based computing device is configured to:
   execute the Unix-based ZFS file system,
   using the Unix-based ZFS file system, configure a first volume on the block storage array,
   mount the first volume as a ZFS pool,
   using the Unix-based ZFS file system, configure a second volume within the ZFS pool on the block storage array, and
   present the second volume as a block storage device identified by a first logical unit number (LUN) to a first Windows-based computing device that is communicatively coupled to the Unix-based computing device; and
   wherein the first Windows-based computing device is configured to:
   execute a Windows-based file system,
   mount the first logical unit number (LUN) as block data storage,
   access via the Unix-based computing device the second volume presented as the first LUN, and
   obtain native Windows-based access to data stored in the second volume according to the Windows-based file system, wherein the second volume is configured by the Unix-based computing device within the ZFS pool, and wherein the native Windows-based access is obtained without protocol conversion between the Windows-based file system and the Unix-based ZFS file system.

17. The system of claim 16 wherein the Unix-based computing device is further configured to:
   using the Unix-based ZFS file system, create a ZFS clone of the second volume, wherein the ZFS clone represents a copy of the second volume, and wherein the ZFS clone is also part of the ZFS pool; and
   present the ZFS clone to a second Windows-based computing device as a block storage device identified by a second logical unit number (LUN), which lacks an indication that the block storage device identified by the second LUN is a ZFS clone, thereby enabling the second Windows-based computing device to access the second LUN via the Unix-based computing device.

18. The system of claim 16 wherein the Unix-based computing device is further configured to:
   using the ZFS file system, create a ZFS clone of the second volume, wherein the ZFS clone represents a copy of the second volume, and wherein the ZFS clone is also part of the ZFS pool, present the ZFS clone to a second Windows-based computing device as a block storage device identified by a second logical unit number (LUN), thereby enabling the second Windows-based computing device to access the second LUN via the Unix-based computing device, and
   wherein the second Windows-based computing device is communicatively coupled to the Unix-based computing device; and
   wherein the second Windows-based computing device is configured to:
   mount the second logical unit number (LUN), and
   obtain native Windows-based access to data stored in the copy of the second volume, which was configured as a ZFS clone within the ZFS pool, under a Windows-based file system executing on the second Windows-based computing device without protocol conversion by the Unix-based computing device between the Windows-based file system and the Unix-based ZFS file system.

19. The system of claim 16 wherein the Unix-based computing device is further configured to:
   create a ZFS clone of the second volume configured under the ZFS file system, wherein the ZFS clone represents a copy of the second volume, and wherein the ZFS clone is also part of the ZFS pool; and
   present the ZFS clone to a second Windows-based computing device as a block storage device identified by a second logical unit number (LUN), thereby enabling the second Windows-based computing device to obtain native access to data in the second LUN via the Unix-based computing device.

20. The system of claim 16 wherein the Unix-based computing device is further configured to:
   within the ZFS pool create a ZFS clone of the second volume, wherein the ZFS clone represents a copy of the second volume;
   present the ZFS clone to a second Windows-based computing device as a block storage device identified by a second logical unit number (LUN), thereby enabling the second Windows-based computing device to access the second LUN via the Unix-based computing device; and
   wherein the second Windows-based computing device is configured to:
   mount the second logical unit number (LUN) as presented by the Unix-based computing device, and
   under a Windows-based file system executing on the second Windows-based computing device and without protocol conversion by the Unix-based computing device between the Windows-based file system and the Unix-based ZFS file system,
   obtain Windows-based native access to data stored in the copy of the second volume, which was configured under the ZFS file system.

* * * * *